United States Patent
Li et al.

(10) Patent No.: US 11,951,864 B2
(45) Date of Patent: Apr. 9, 2024

(54) CHARGING STATION MONITORING SYSTEM

(71) Applicant: Volvo Car Corporation, Gothenburg (SE)

(72) Inventors: Wei Li, Shanghai (CN); Huapeng Lu, Shanghai (CN); Xuming Yao, Shanghai (CN); Youjia Zhou, Shanghai (CN); Jie Lei, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 402 days.

(21) Appl. No.: 17/487,109

(22) Filed: Sep. 28, 2021

(65) Prior Publication Data
US 2022/0009368 A1 Jan. 13, 2022

Related U.S. Application Data

(63) Continuation-in-part of application No. 16/597,872, filed on Oct. 10, 2019, now Pat. No. 11,155,177.

(30) Foreign Application Priority Data

Nov. 20, 2018 (CN) .......................... 201811380607.1

(51) Int. Cl.
*B60L 53/65* (2019.01)
*B60L 53/30* (2019.01)
(Continued)

(52) U.S. Cl.
CPC ............. *B60L 53/65* (2019.02); *B60L 53/305* (2019.02); *B60L 53/31* (2019.02); *B60L 53/62* (2019.02);
(Continued)

(58) Field of Classification Search
CPC .......... B60L 53/31; B60L 53/62; B60L 53/65; B60L 53/305; H02J 7/0013;
(Continued)

(56) References Cited

U.S. PATENT DOCUMENTS 10,021,354 B2  7/2018 Haas
11,155,177 B2 * 10/2021 Li ............................ B60L 53/30
(Continued)

FOREIGN PATENT DOCUMENTS

CN        207022039 U      2/2018

OTHER PUBLICATIONS

Apr. 7, 2020 Partial European Search Report issued on International U.S. Appl. No. 19/205,165.
(Continued)

*Primary Examiner* — Edward Tso
*Assistant Examiner* — Aaron Piggush
(74) *Attorney, Agent, or Firm* — Clements Bernard Walker; Christopher L. Bernard

(57) ABSTRACT

A charging station monitoring system including: a sensing device, a digital camera and a communication device which are arranged at a charging apparatus of a charging station, the sensing device and the digital camera each having a sensing range covering a parking lot associated with the charging apparatus and an area around the parking lot; a controller configured to determine an occupation state of the parking lot and/or detect and record an action of a third party or foreign object based on sensed information from the sensing device and the digital camera; and a charging assistance device configured to recommend an environmentally friendly charging station if an energy storage device of the electric vehicle has not been fully charged and needs to be further charged.

5 Claims, 4 Drawing Sheets

(51) Int. Cl.
  *B60L 53/31* (2019.01)
  *B60L 53/62* (2019.01)
  *H01M 10/44* (2006.01)
  *H02J 7/00* (2006.01)
  *G06V 20/52* (2022.01)
  *H04N 7/18* (2006.01)
  *H04N 23/60* (2023.01)

(52) U.S. Cl.
  CPC ........... *H01M 10/44* (2013.01); *H02J 7/0013* (2013.01); *H02J 7/00712* (2020.01); *G06V 20/52* (2022.01); *H01M 2220/10* (2013.01); *H01M 2220/20* (2013.01); *H04N 7/18* (2013.01); *H04N 23/60* (2023.01)

(58) Field of Classification Search
  CPC .............. H02J 7/00712; H01M 10/44; H01M 2220/10; H01M 2220/20; H04N 23/60; H04N 7/18; G06V 20/52
  USPC .................................. 320/104, 107, 108, 109
  See application file for complete search history.

(56) References Cited

U.S. PATENT DOCUMENTS

| | | | |
|---|---|---|---|
| 2010/0211340 A1* | 8/2010 | Lowenthal | B60L 53/305 903/907 |
| 2010/0280678 A1 | 11/2010 | Tate et al. | |
| 2012/0233077 A1 | 9/2012 | Tate et al. | |
| 2014/0344026 A1* | 11/2014 | Outwater | G07B 15/02 705/13 |
| 2015/0202975 A1 | 7/2015 | Solomon et al. | |
| 2015/0356498 A1* | 12/2015 | Casanova | G07B 15/02 705/13 |
| 2017/0237944 A1* | 8/2017 | Haas | B60L 53/65 348/143 |
| 2017/0337448 A1* | 11/2017 | Ng | B60L 53/00 |
| 2018/0316229 A1 | 11/2018 | Anwer et al. | |

OTHER PUBLICATIONS

Sep. 16, 2020 Extended European search report issued on international U.S. Appl. No. 19/205,165.

\* cited by examiner

CHARGING STATION MONITORING SYSTEM

CROSS-REFERENCE TO RELATED APPLICATIONS

The present disclosure is a continuation-in-part of co-pending U.S. patent application Ser. No. 16/597,872, filed on Oct. 10, 2019, and entitled "Charging Station Monitoring System," which claims the benefit of priority of co-pending Chinese Patent Application No. 201811380607.1, filed on Nov. 20, 2018, and entitled "Charging Station Monitoring System," the contents of both of which are incorporated in full by reference herein.

TECHNICAL FIELD

The present disclosure relates to a charging station monitoring system which is able to actively monitor the state of the charging station and recommend an environmentally friendly charging station.

BACKGROUND

Electric vehicles, including pure electric vehicles, hybrid power vehicles, etc., are also called new energy vehicles. An electric vehicle uses a vehicle carried battery as a power source to energize an electric motor to drive the vehicle to run. With respect to traditional fuel vehicles, electric vehicles have good application prospects since they have less damaging effects on the environment. The vehicle carried battery needs to be charged after its energy is consumed to a certain extent. In order to enable the rapid adoption of electric vehicles, various charging stations have been established. The charging stations are generally set at public parking lots, large shopping centers, road-side areas that allow parking, highway service centers, residential areas, etc. A charging station generally includes charging apparatuses and parking lots containing charging apparatuses. In many charging stations, there are no service personnel, and vehicle charging can be achieved by drivers with self-service.

Unfortunately, it has been found that some non-charging vehicles, for example, fuel vehicles like gasoline vehicles and diesel vehicles, sometimes occupy the parking lots designated for electric vehicles with the associated charging apparatuses. For example, it was reported that in an area that about ⅔ of its parking lots associated with the charging apparatuses were occupied by non-charging vehicles at a certain time. When the parking lots associated with the charging apparatuses are occupied by non-charging vehicles, electric vehicles are blocked from charging.

In addition, the vehicle carried battery of an electric vehicle needs a long time to charge, so the driver generally leaves the vehicle after the charging has started. It has been found that some people may engage in undesirable behavior and actions to the vehicle under charging when the driver is absent. For example, a third party may take the charging apparatus off the vehicle so the vehicle is not properly charged. There are also some people who may take adverse actions to certain electric vehicles being charged.

It is therefore desired to actively monitor the charging station to find undesired occupation of the parking lots associated with the charging apparatuses, undesirable actions to the vehicles under charging, etc.

SUMMARY

An object of the present disclosure is to provide a charging station monitoring system which is able to monitor the state of the charging station and recommend an environmentally friendly charging station.

To achieve this objective, the disclosure in one aspect provides a charging station monitoring system including: a radar, a digital camera and a communication device which are arranged at a charging apparatus of a charging station, the radar and the digital camera each having a sensing range covering a parking lot associated with the charging apparatus and an area around the parking lot, the communication device being configured to communicate with a cloud server which is associated with an intelligent portable device of a user, the digital camera being normally closed, and the charging apparatus being normally deactivated; said charging station having option to use green energy available thereto for charging; a controller configured to activate the digital camera based on sensed information from the radar, to determine whether a vehicle entering the parking lot is an electric vehicle or not when the radar senses the vehicle is entering the parking lot, to wake up the charging apparatus if the controller determines that the vehicle is an electric vehicle, and to send an amount of available green energy of the charging station to the electric vehicle after the charging apparatus is woken up; and a charging assistance device being configured to determine whether the available green energy of the charging station is enough to fully charge an energy storage device of the electric vehicle, to calculate a first recommended charging amount if the available green energy is enough to fully charge the energy storage device and to calculate a second recommended charging amount if the available green energy is not enough to fully charge the energy storage device, the first recommended charging amount being a charging amount with which the energy storage device can be fully charged, and the second recommended charging amount being a charging amount with which the electric vehicle is allowed to travel a predetermined distance that is greater than a distance between a current position of the electric vehicle and a destination of a current trip.

According to an embodiment of the disclosure, in the case that the available green energy of the charging station is not enough to fully charge the energy storage device, the charging assistance device is further configured to: calculate a third recommended charging amount and a charging time required to charge the third recommended charging amount of energy, a sum of the second recommended charging amount and the third recommended charging amount being equal to the first recommended charging amount; determine a set of charging stations within the predetermined distance; estimate a total amount of green energy that can be provided by each charging station of the set of the charging stations during the charging time; and generate a recommendation list including a recommended priority of each charging station of the set of the charging stations, the recommended priority being determined based on the estimated total amount of green energy and a distance between the current position of the electric vehicle and each charging station.

According to an embodiment of the disclosure, said charging station further includes energy storage hardware, and the recommendation list further includes type information of said energy storage hardware, the type of the energy storage hardware including a secondary battery and a new battery; and in the case that estimated total amounts of green energy of two charging stations are same, a recommended priority of a charging station comprising a secondary battery is higher than that of a charging station comprising a new battery.

According to an embodiment of the disclosure, in the case that the estimated total amounts of green energy of two or more charging stations are greater than the third recommended charging amount, the recommended priority of each of the two or more charging stations is determined based on the distance between the current position of the electric vehicle and each of the two or more charging stations.

According to an embodiment of the disclosure, the recommendation list further includes an energy saving level of each charging station, and, in the case that estimated amounts of green energy of two or more charging stations are greater than the third recommended charging amount, the recommended priority of each of the two or more charging stations is determined based on the energy saving level of each of the two or more charging stations.

According to an embodiment of the disclosure, the controller is further configured to send the occupation state of the charging apparatus to the cloud server after the charging apparatus starts to charge the vehicle; and, when the controller determines that the vehicle entered the parking lot is a non-electric vehicle, the controller sends corresponding information of the vehicle to the cloud server, and the cloud server then sends the received information to the user's intelligent portable device.

According to an embodiment of the disclosure, the controller is further configured to detect and record an action of a third party or a foreign object based on sensed information from the radar and the digital camera.

According to an embodiment of the disclosure, the controller is configured to determine whether a vehicle in the parking lot is a non-electric vehicle or whether the action of a third party or a foreign object is undesirable based on the images captured by the digital camera.

According to an embodiment of the disclosure, the controller determines that the vehicle entered the parking lot is a non-electric vehicle or the action of the third party or foreign object is undesirable, the controller sends corresponding information, images and/or video to the cloud server, and the cloud server sends the received information, images and/or video to the user's intelligent portable device.

According to an embodiment of the disclosure, the controller is configured to activate the digital camera when it receives a request to check real-time images or video of the charging apparatus and/or the parking lot from the user's intelligent portable device via the cloud server, and to send the real-time images or video captured by the digital camera to the cloud server, and the cloud server sends the real-time images or video to the user's intelligent portable device.

According to an embodiment of the disclosure, the controller is further configured to activate the digital camera based on a request from the user's intelligent portable device as received via the cloud server, and to send images and video captured by the digital camera to the cloud server via the communication device.

According to an embodiment of the disclosure, the system further includes a warning device arranged at the charging apparatus to issue corresponding warning signal or communications regarding a non-electric vehicle entering the parking lot.

According to an embodiment of the disclosure, the controller is configured to send the occupation state of the charging apparatus to the cloud server after the charging apparatus starts to charge the vehicle.

According to an embodiment of the disclosure, the system further includes the cloud server which is in communication with the communication device on one hand and in communication with the user's intelligent portable device on the other hand.

According to an embodiment of the disclosure, the cloud server is configured to record images and video that are captured by the digital camera and received via the communication device.

According to an embodiment of the disclosure, the cloud server is configured to send the recorded images and/or video captured by the digital camera to the user's intelligent portable device in the condition that it receives a request to check the historical records of the charging apparatus and/or the parking lot from the user's intelligent portable device.

According to an embodiment of the disclosure, the cloud server is further in communication with an online map cloud server, and the online map cloud server sends the occupation state of the charging apparatus to the online map cloud server.

DETAILED DESCRIPTION

Now some embodiments of the present disclosure will be described with reference to the drawings.

Figure 1:
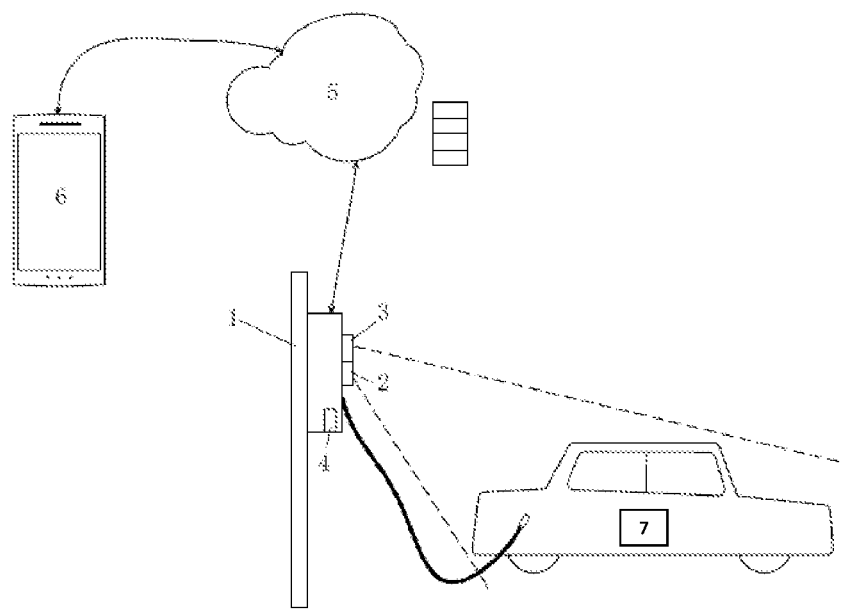
FIG. 1 is a schematic layout of a charging station monitoring system according to the disclosure.

As shown in FIG. 1, the disclosure generally relates to a charging station monitoring system which includes a sensing device 2 and a digital camera 3 which are provided in association with a charging apparatus 1 (for example, charging box, charging pile, etc.) of a charging station. The sensing device 2 and the camera 3 each have a sensing area that covers a parking lot associated with the charging apparatus 1 and an area around the parking lot of the charging apparatus.

The sensing device 2 may include one or more of a radar, a underground pressure sensor, a near field monitoring device, an infrared sensor, a proximal sensor, etc. A preferred embodiment of the sensing device 2 is a radar considering that radar is more sensitive to a moving object.

When necessary, the charging station monitoring system may further include a warning device 4, such as audio and/or video warning device, associated with the charging apparatus 1 in the charging station.

The sensing device 2 and the camera 3 may be integrated in the charging apparatus 1, and the warning device 4 may also be integrated in the charging apparatus 1.

The charging station monitoring system further includes a cloud server 5 which is able to wirelessly communicate with the charging station or the charging apparatus 1 and an intelligent portable device 6 (such as a smartphone) of a user (the owner of the charging station and/or the owner or driver of an electric vehicle). For this end, a communication device (not shown) is provided in the charging station or the charging apparatus 1. The communication device may be a wireless-type communication device which can communicate with the cloud server 5 directly in a wireless manner; alternatively, the communication device may be a wire-type communication device which can communicate with a back end service station that is able to wirelessly communicate with the cloud server 5.

The sensing device 2, the camera 3, the communication device and the optional warning device 4 provided in or at the charging apparatus 1 are connected with a controller (not shown) provided in, at, or at back end of the charging apparatus 1.

The user's intelligent portable device 6 is mounted with a corresponding application program ("APP"). The intelligent portable device 6 can be connected to the charging station monitoring system through boning with a corresponding service account, scanning a QR code, or the like.

Through the cloud server 5, communication is established between the charging station or the charging apparatus 1 and the user's intelligent portable device 6, so that various data, including information, notification, video stream, command, etc., can be transferred between the charging station or the charging apparatus 1 and the intelligent portable device 6. The cloud server 5 can also record various historical data.

The sensing device 2 is used for sensing the occupation state of the parking lot of the charging apparatus, and the controller determines whether the parking lot associated with the charging apparatus is empty or be occupied by a vehicle based on the sensed information of the sensing device 2.

The camera 3 is used to capture images of a vehicle which occupies the parking lot of the charging apparatus, and the controller determines the type of the vehicle which occupies the parking lot associated with the charging apparatus based on the images captured by the camera 3. For example, by scanning and identifying the license plate of the vehicle, it can determine whether the vehicle is an electric vehicle or not. In general, the license plates of electric vehicles are different from that of fuel vehicles. Thus, the type of a vehicle can be determined by identifying its license plate (identification). In addition, the manufacturer and model of a vehicle can be determined using the images of the vehicle, and the type of the vehicle can be checked against a database.

If the controller determines that the vehicle is a non-electric vehicle, it sends corresponding information to the user's intelligent portable device 6 via the cloud server 5. The warning device 4 (if there is one) can emit corresponding warnings to urge the non-electric vehicle to turn away. In another embodiment, if an electric vehicle runs into the parking lot but no charging action has happened after a long time, corresponding information may be sent to the user's intelligent portable device 6 via the cloud server 5.

The camera 3 is also used to capture images of a human, animal or object that is in or near the parking lot of the charging apparatus, and the controller can thus identify improper or unauthorized actions, such as destroying the infrastructure, damaging the vehicle, and undesired behaviors (including but not limited to removing the charging device), etc. Once the controller finds an improper or unauthorized action, it can send corresponding information to the user's intelligent portable device 6 via the cloud server 5. The warning device 4 (if there is one) may emit corresponding warning.

The charging station monitoring system may further include a charging assistance device 7. The charging assistance device 7 can be disposed in the electric vehicle to be charged. The charging assistance device 7 could be disposed in a cloud server that communicates with the electric vehicle to be charged. The charging assistance device 7 can recommend an environmentally friendly charging station (a green/low-carbon charging station, which charges a vehicle using energy that is generated from renewable energy source, such as wind, solar, or water, geothermal and so on.) for the electric vehicle. For example, the charging assistance device 7 includes a strategy for recommending an environmentally friendly charging station. The charging assistance device 7 may further include or communicates to a human machine interface (HMI) which may output information to a user (e.g., a driver of the electric vehicle) and receive information from the user. For example, a recommendation list is presented on the HMI to enable the user to select a charging station from the recommendation list.

The charging assistance device 7 may be implemented by means of hardware or software or a combination of hardware and software, including a non-transitory computer readable medium stored in a memory and implemented as instructions executed by a processor. Regarding the part implemented by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The part implemented by software may include microcode, program code or code segments. The software may be stored in a machine-readable storage medium, such as a memory. An exemplary working principle of the charging assistance device 7 will be described below.

Figure 2:
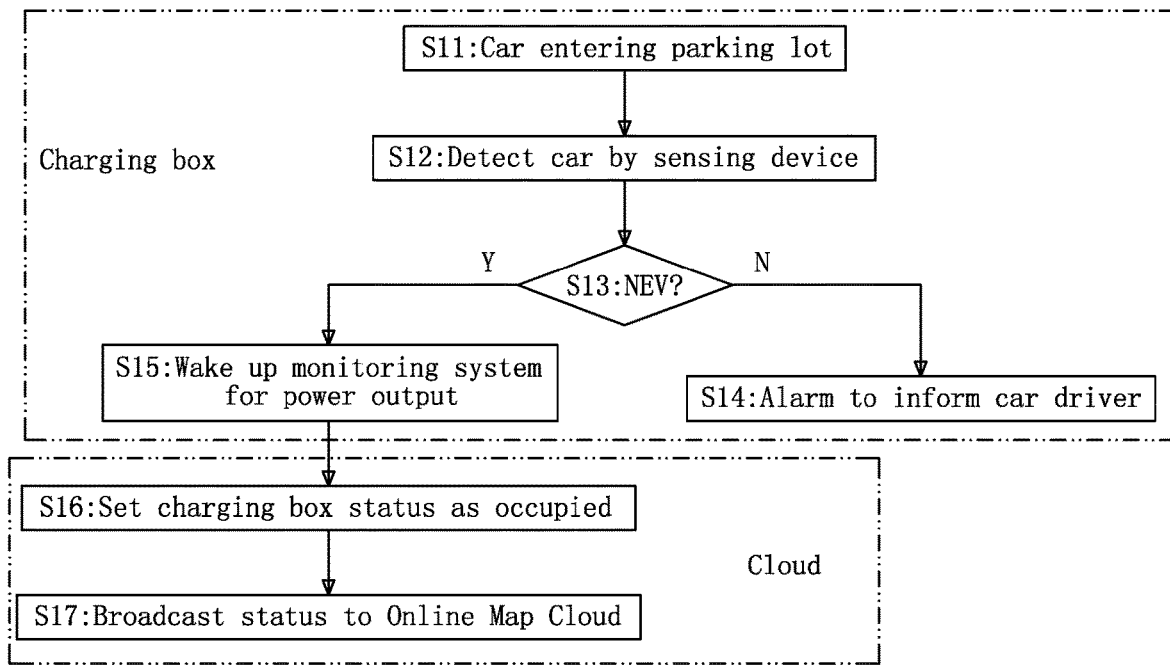
FIG. 2 is a flow chart of an operation of the charging station monitoring system to actively monitor a vehicle entering a charging station.

A program of the disclosure for actively monitoring a vehicle entering the charging station based on the images captured by the camera 3 is illustrated in FIG. 2. First, in Step S11, there is a vehicle entering the parking lot associated with the charging apparatus 1.

Then, in Step S12, the sensing device 2 associated with the charging apparatus 1 sensed the entering or presence of the vehicle. It is noted that, thanks to the relatively high sensitivity of sensing device to the moving of an object, the sensing device 2 can sense the vehicle entering the parking lot associated with the charging apparatus precisely and reliably.

Then, in Step S13, the controller judges whether the entered vehicle is an electric vehicle. If the controller result is "No", the program goes to Step S14; and if the controller result is "Yes", the program goes to Step S15.

In Step S14, the controller instructs the warning device 4 (if there is one) to emit corresponding warning to indicate that it is not proper for the entered vehicle to be parked in this parking lot. Another possible embodiment of the invention is that the controller sends the occupation state of the parking lot to the cloud server 5 which then sends corresponding information to the intelligent portable device 6 of the charging station owner.

In Step S15, the controller wakes up (turns on) the charging apparatus 1 for preparation for charging and then charging the entered vehicle. Then the program goes to Step S16. It should be noted that the charging apparatus 1 may be normally deactivated, and is activated when it is woke up by the controller and then goes into a ready for charging state. In this way, energy can be saved.

In Step S16, at the side of the cloud server 5, the occupation state of the charging apparatus 1 is set to be occupied.

Then, in Step S17, the cloud server 5 sends the occupation state of the charging apparatus 1 to an online map cloud server. Based on the information provided by the online map cloud server, other vehicles can obtain the occupation state of this charging apparatus, so a vehicle, which was planned to come to this charging apparatus to charge its battery, can go to other charging apparatus.

Figure 3:
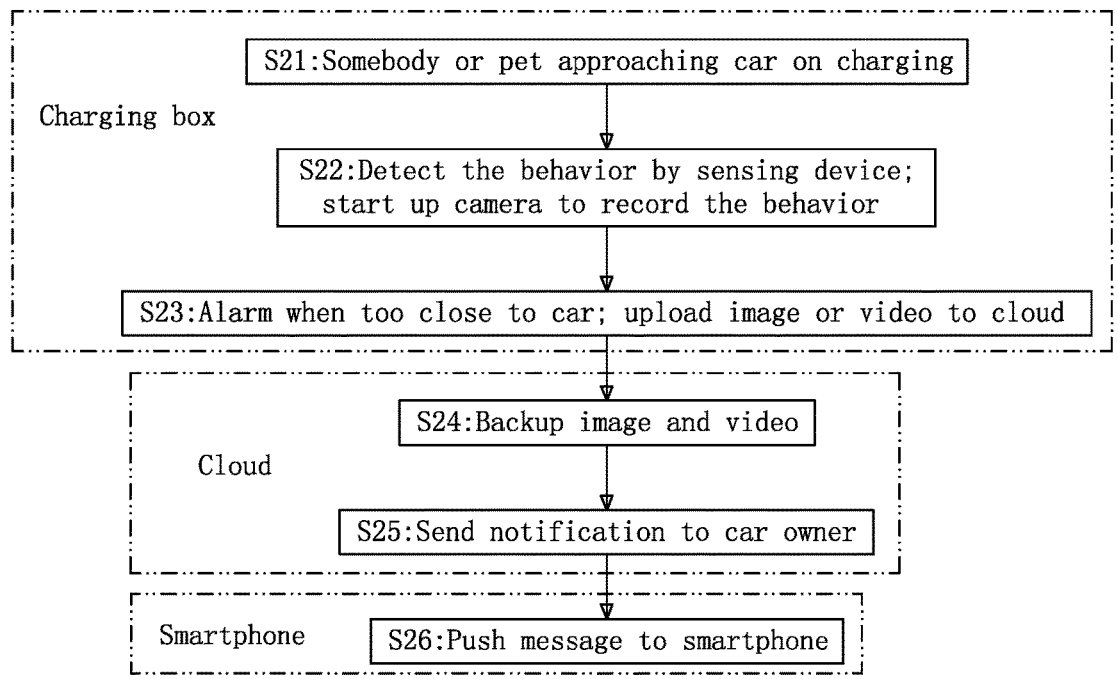
FIG. 3 is a flow chart of an operation of the charging station monitoring system to actively monitor a person or an animal approaching the charging station.

A program of the disclosure for actively monitoring a human, animal or other object approaching the charging station based on the images captured by the camera 3 is illustrated in FIG. 3. First, in Step S21, a human, animal or other object is approaching the electric vehicle which is parked in the parking lot associated with the charging apparatus 1 and is being charged with the charging apparatus 1.

Then, in Step S22, the sensing device 2 associated with the charging apparatus 1 senses the action of the human, animal or other object approaching the vehicle under charging, and the controller activates the camera 3 to record this action.

Then, in Step S23, when the controller judges that the human, animal or other object is too close to the vehicle under charging, it instructs the warning device 4 (if there is) to emit corresponding warning. In another embodiment of the invention, the controller sends information (in image and/or video) about the action of the human, animal or other object approaching the vehicle to the cloud server 5.

Then, in Step S24, at the side of the cloud server 5, the received images and/or videos are backed up.

Then, in Step S25, the cloud server 5 sends corresponding information or notification to the intelligent portable device 6 of the owner of the charging station and/or the driver (or owner) of the electric vehicle.

Then, in Step S26, the intelligent portable device 6 receives the information or notification from the cloud server 5 and creates an indication message (for example, via ring or vibration).

It is noted that the camera 3 may be normally closed, and is activated when the controller determines that there is a vehicle entering a parking lot associated with the charging apparatus or a human, animal or other object becomes too close to the vehicle under charging. In this way, energy can be saved. The camera 3 may be activated together with the charging apparatus 1 to monitor the charging procedure of the vehicle.

The operations of the charging station monitoring system as described above with reference to FIGS. 2 and 3 are triggered at the side of the charging station. On the other hand, the disclosure also provides embodiments in which operations, for example, those shown in FIGS. 4 and 5, of the charging station monitoring system are triggered by the intelligent portable device 6.

Figure 4:
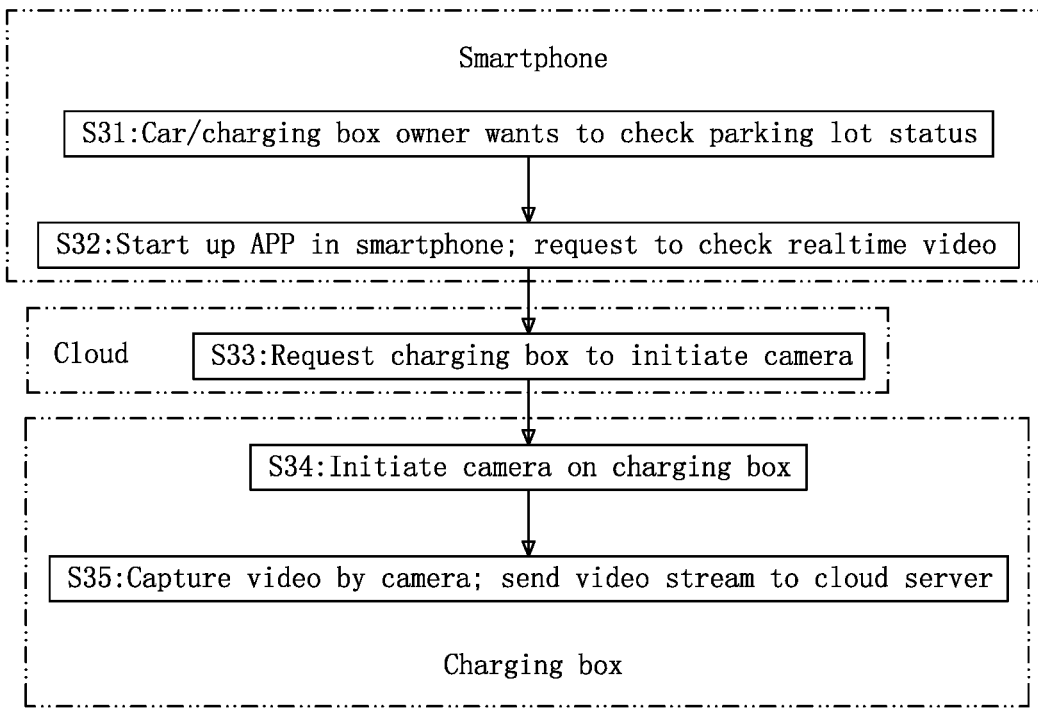
FIG. 4 is a flow chart of an operation of the charging station monitoring system to check the state of the charging station based on a request from a user.

In FIG. 4, first, in Step S31, the owner of the charging station or the driver (or owner) of the electric vehicle wants to check the real-time state of the parking lot associated with the charging apparatus 1. For example, when the driver wants to go to the charging apparatus 1 to charge the vehicle, he may check the state of the charging apparatus 1 to avoid making a futile trip.

Then, in Step S32, the owner of the charging station or the driver (or owner) of the electric vehicle initiates the corresponding application program in the intelligent portable device 6, and sends a request for checking the real-time video of the parking lot associated with the charging apparatus 1.

Then, at the side of the cloud server 5, in Step S33, it sends a request for activating the camera 3 associated with the charging apparatus 1.

Then, at the side of the charging station, in Step S34, the camera 3 associated with the charging apparatus 1 is activated.

Then, in Step S35, the camera 3 captures real-time video of the parking lot of the charging apparatus, the controller at the charging apparatus 1 sends real-time images and/or video to the cloud server 5 via the communication device, and the cloud server 5 can send the received real-time images and/or video to the intelligent portable device 6.

It is noted that, since the camera 3 is closed in a normal state and is activated under the request from the intelligent portable device 6, energy can be saved.

Figure 5:
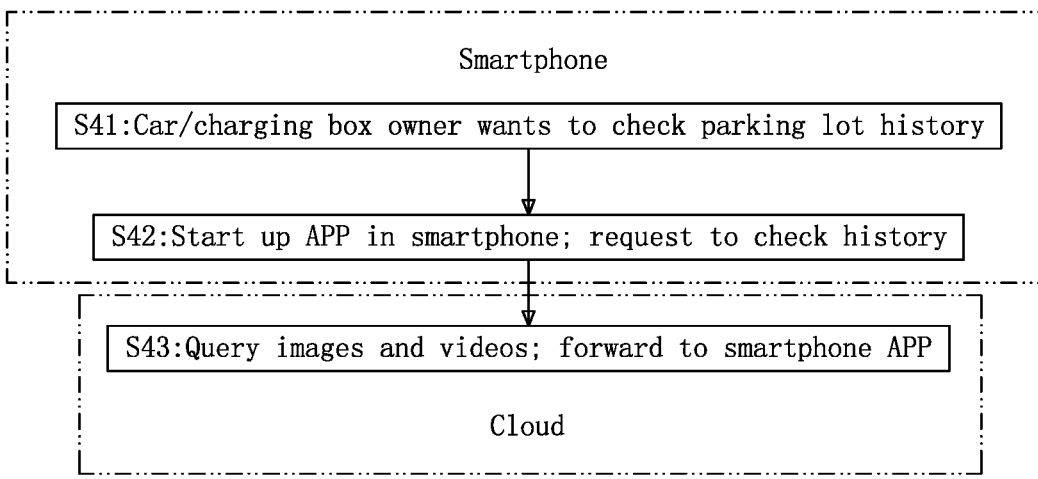
FIG. 5 is a flow chart of an operation of the charging station monitoring system to check the historical records of the charging station based on a request from a user.

In FIG. 5, first, in Step S41, the owner of the charging station or the driver (or owner) of the electric vehicle wants to check the historical records of the parking lot associated with the charging apparatus 1.

Then, in Step S42, the owner of the charging station or the driver (or owner) of the electric vehicle initiates the corresponding application program in the intelligent portable device 6, and sends a request for checking the historical records of the parking lot associated with the charging apparatus 1.

Then, at the side of the cloud server 5, in Step S43, it queries the historical records (in image or video) of the parking lot associated with the charging apparatus 1, and sends the historical records to the intelligent portable device 6.

Of course, a skilled in the art can make adaptive modifications to the components and functions of the charging station monitoring system of the disclosure according to real requirements.

According to the disclosure, this invention enables a user to actively monitor a vehicle that enters a parking lot associated with the charging apparatus or a third party or foreign object that approaches a vehicle under charging based on the functionalities equipped at the charging apparatus, and to obtain real-time or historical records of the charging station upon user's request. Thus, usage efficiency of the charging station is guaranteed, and meaningless waste of time can be avoided. In addition, undesirable actions can be effectively prevented in the charging station.

The operations of the charging station monitoring system as described above are triggered by the charging station or the intelligent portable device. The disclosure also provides embodiments in which operations, for example, those shown in FIGS. 6 and 7, of the charging station monitoring system are implemented by the charging assistance device 7.

Figure 6:
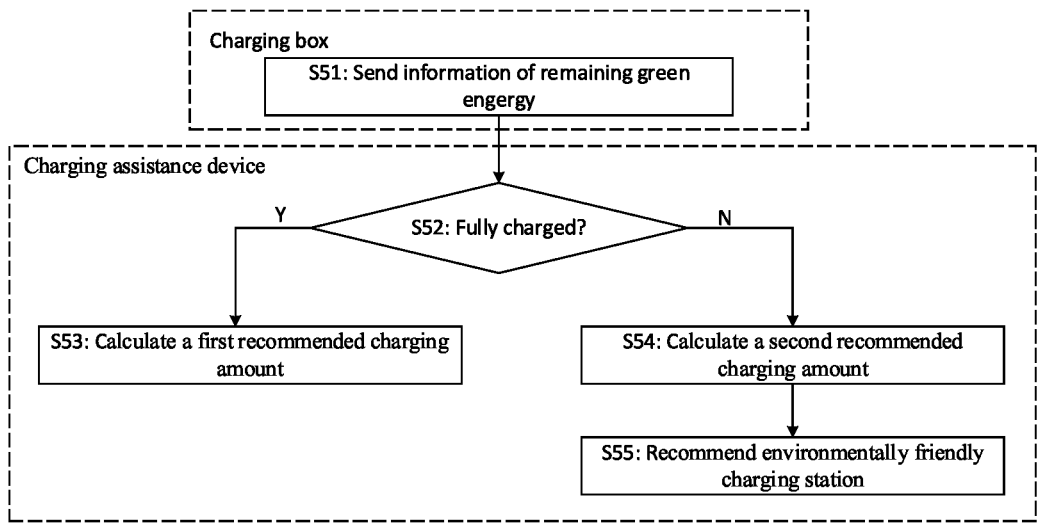
FIG. 6 is a flow chart of an operation of the charging station monitoring system to recommend an environmentally friendly charging station.
Figure 7:
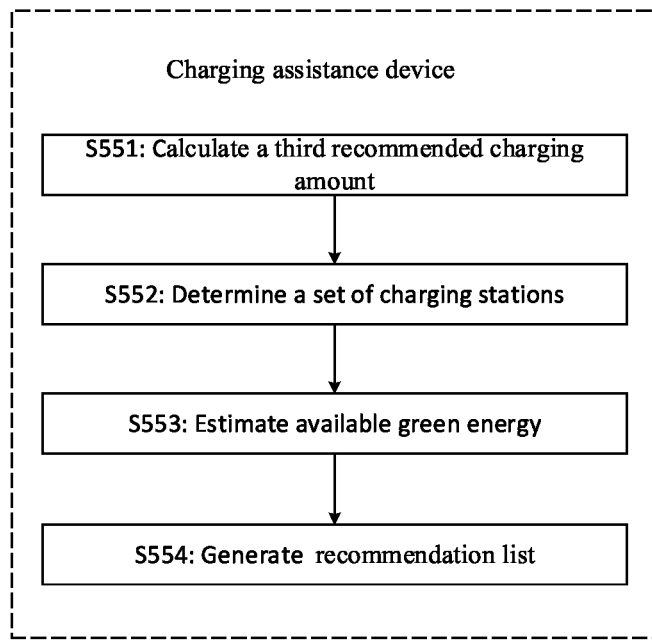
FIG. 7 shows sub-steps of a main step of the operation illustrated in FIG. 6.

Referring to FIG. 6, first, in Step S51, the controller sends an amount of available green energy (energy that is generated from renewable energy source, such as wind, solar, or water, geothermal and so on) of the charging station to the electric vehicle (i.e., the electric vehicle which has entered the parking lot) after the charging apparatus is woken up. The amount of available green energy includes the remaining green energy allocated to such charging station for charging (e.g. allocated to the charging station from the green energy supplied through the grid) and any additional green energy that could be generated by the charging station for charging during the period required to fully charge the vehicle.

In Step S52, the charging assistance device 7 of the electric vehicle receives the amount of available green energy via a communication interface of the electric vehicle and determines whether an energy storage device of the electric vehicle can be fully charged by the available green energy.

It is noted "fully charging an energy storage device" may include charging the energy storage device to 100%, and may also include charging the energy storage device to nearly 100%. For example, fully charging the energy storage device includes charging the energy storage device to 80%~95%. The "fully charging" may be pre-defined by a user and set in a battery management system (BMS) of the electric vehicle.

In the case that the energy storage device of the electric vehicle is determined to be fully charged by the available green energy of the present charging station, the process goes to Step S53. In Step S53, the charging assistance device 7 calculates a first recommended charging amount. The first recommended charging amount is a charging amount with which the energy storage device can be fully charged. In this step, charging information may be presented on the HMI. For example, the following information is present on the HMI: the first recommended charging amount, and an energy source that is a green energy source.

In the case that the energy storage device of the electric vehicle is determined not to be able to be fully charged by the available green energy, the process goes to Step S54. In Step S54, the charging assistance device 7 calculates a second recommended charging amount. The second recommended charging amount is a charging amount with which the electric vehicle is allowed to travel a predetermined distance which is greater than a distance between a current position of the electric vehicle and a destination of a current trip.

In an example, the charging assistance device 7 may obtain a schedule or trip itinerary of the user from an APP of the user's intelligent portable device and determine the destination of the current trip based on the schedule or trip itinerary. In another example, the destination of the current trip may be received via HMI from the user.

In Step S55, in the case that the energy storage device of the electric vehicle has not been fully charged and needs to be further charged, the charging assistance device 7 recommends an environmentally friendly charging station based on the distance between a charging station and the electric vehicle and an estimated total amount of the green energy such charging station can provide to the electric vehicle during the period required to fully charge the vehicle. Sub-steps of Step S55 according to an embodiment of the disclosure will be described with reference to FIG. 7.

In Sub-step S551, in the case that the energy storage device of the electric vehicle cannot be fully charged by the remaining allocated green energy, the charging assistance device 7 calculates a third recommended charging amount and estimates the time required to charge the third recommended charging amount of energy. The sum of the second recommended charging amount and the third recommended charging amount is equal to the first recommended charging amount (i.e., the charging amount with which the energy storage device is fully charged).

In Sub-step S552, the charging assistance device 7 determines a set of charging stations within the predetermined distance based on map information (which may be greater than a distance between a current position of the electric vehicle and a destination of a current trip as discussed above). The charging assistance device 7 may obtain the map information from one or more of a cloud server, a navigation system of the electric vehicle or an intelligent portable device.

In Sub-step S553, the charging assistance device 7 estimates a total amount of green energy that can be provided by each of the charging stations determined based on the map information during the time required to charge the third recommended charging amount of energy. The estimated total amount of green energy is a sum of the amount of remaining allocated green energy of each charging station and the amount of green energy that can be generated by the same charging station for charging during the time required to charge the third recommended charging amount of energy. For example, such charging station may have a solar panel to generate additional solar energy that is available to charge the vehicle during the charging period The amount of green energy that the same charging station can generate during the required charging time relates to the weather conditions and geographical area conditions of the specific charging station.

In Sub-step S554, the charging assistance device 7 generates a recommendation list including a recommended priority of each charging station determined based on the map information. The recommended priority is calculated based on the estimated total amount of green energy that can be provided by the charging station and a distance between the current position of the electric vehicle and each charging station.

In an example, in the case that the estimated amount of green energy of two or more charging stations is each greater than the second recommended charging amount, a recommended priority of the two or more charging stations is determined based on a distance between the current position of the electric vehicle and each of the two or more charging stations. For example, the shorter the distance between a charging station and the current position of the electric vehicle is, the higher the recommended priority of the charging station is determined.

In determining the recommended priority of each charging station, the type of energy storage hardware of each charging station may be considered. The type of energy storage hardware of the charging stations could include a secondary battery and a new battery.

In an example, each charging station further comprises energy storage hardware. The recommendation list further includes type information of the energy storage hardware of each charging station. In the case that the estimated total amounts of green energy of two charging stations are same, the recommended priority of a charging station having a secondary battery is higher than that of a charging station having a new battery.

In determining the recommended priority of each charging station, an energy saving level of a charging station may be considered. The energy saving level may be assessed by a particular organization (e.g., an industrial organization, or a government authority that has the authority or delegation to evaluate energy saving) and output as an evaluation parameter by a charging station when necessary.

In an example, the recommendation list further includes an energy saving level of each charging station. In the case that the estimated amounts of green energy of two or more charging stations are greater than the third recommended charging amount, a recommended priority of each of the two or more charging stations is determined based on an energy saving level of each of the two or more charging stations. For example, the higher the energy saving level of a charging station is, the higher the recommended priority of the charging station is determined.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

What is claimed is:

1. A charging station monitoring system comprising:
a radar, a digital camera and a communication device which are arranged at a charging apparatus of a charging station, the radar and the digital camera each having a sensing range covering a parking lot associated with the charging apparatus and an area around the parking lot, the communication device being configured to communicate with a cloud server which is associated with an intelligent portable device of a user, the digital camera being normally closed, and the charging apparatus being normally deactivated; said charging station having option to use green energy available thereto for charging;
a controller configured to activate the digital camera based on sensed information from the radar, to determine whether a vehicle entering the parking lot is an electric vehicle or not when the radar senses the vehicle is entering the parking lot, to wake up the charging apparatus if the controller determines that the vehicle is an electric vehicle, and to send an amount of available green energy of the charging station to the electric vehicle after the charging apparatus is woken up; and
a charging assistance device being configured to determine whether the available green energy of the charging station is enough to fully charge an energy storage device of the electric vehicle, to calculate a first recommended charging amount if the available green energy is enough to fully charge the energy storage device and to calculate a second recommended charging amount if the available green energy is not enough to fully charge the energy storage device, the first recommended charging amount being a charging amount with which the energy storage device can be fully charged, and the second recommended charging amount being a charging amount with which the electric vehicle is allowed to travel a predetermined distance that is greater than a distance between a current position of the electric vehicle and a destination of a current trip.

2. The charging station monitoring system of claim 1, wherein, in the case that the available green energy of the charging station is not enough to fully charge the energy storage device, the charging assistance device is further configured to:
calculate a third recommended charging amount and a charging time required to charge the third recommended charging amount of energy, a sum of the second recommended charging amount and the third recommended charging amount being equal to the first recommended charging amount;
determine a set of charging stations within the predetermined distance;
estimate a total amount of green energy that can be provided by each charging station of the set of the charging stations during the charging time; and
generate a recommendation list including a recommended priority of each charging station of the set of the charging stations, the recommended priority being determined based on the estimated total amount of green energy and a distance between the current position of the electric vehicle and each charging station.

3. The charging station monitoring system of claim 2, wherein said charging station further comprises energy storage hardware, and the recommendation list further includes type information of said energy storage hardware, the type of the energy storage hardware including a secondary battery and a new battery; and in the case that estimated total amounts of green energy of two charging stations are same, a recommended priority of a charging station comprising a secondary battery is higher than that of a charging station comprising a new battery.

4. The charging station monitoring system of claim 2, wherein, in the case that the estimated total amounts of green energy of two or more charging stations are greater than the third recommended charging amount, the recommended priority of each of the two or more charging stations is determined based on the distance between the current position of the electric vehicle and each of the two or more charging stations.

5. The charging station monitoring system of claim 2, wherein the recommendation list further includes an energy saving level of each charging station, and, in the case that estimated amounts of green energy of two or more charging stations are greater than the third recommended charging amount, the recommended priority of each of the two or more charging stations is determined based on the energy saving level of each of the two or more charging stations.

* * * * *